(12) United States Patent
Olson et al.

(10) Patent No.: US 10,377,573 B2
(45) Date of Patent: Aug. 13, 2019

(54) PADDLE SWEEP

(71) Applicant: SUKUP MANUFACTURING CO., Sheffield, IA (US)

(72) Inventors: Ryan T. Olson, Dows, IA (US); Charles E. Sukup, Dougherty, IA (US); Randal L. Marcks, St. Ansgar, IA (US); David J. Brownmiller, Mason City, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 0 days.

(21) Appl. No.: 15/463,094

(22) Filed: Mar. 20, 2017

(65) Prior Publication Data
US 2017/0275100 A1 Sep. 28, 2017

Related U.S. Application Data

(60) Provisional application No. 62/311,748, filed on Mar. 22, 2016.

(51) Int. Cl.
B65G 19/08 (2006.01)
B65G 21/08 (2006.01)
B65G 65/42 (2006.01)

(52) U.S. Cl.
CPC ............ B65G 21/08 (2013.01); B65G 19/08 (2013.01); B65G 65/425 (2013.01)

(58) Field of Classification Search
CPC ...... B65G 21/08; B65G 19/08; B65G 65/425; B65G 21/10
See application file for complete search history.

(56) References Cited

U.S. PATENT DOCUMENTS

| 1,235,406 | A | | 7/1917 | Williams |
| 2,717,703 | A | | 9/1955 | Kull et al. |
| 3,064,831 | A | * | 11/1962 | Cook ................. A01F 25/2018 222/236 |
| 3,272,355 | A | | 9/1966 | Loesch et al. |
| 3,547,283 | A | | 12/1970 | Beebe et al. |
| 3,621,977 | A | | 11/1971 | Fischer |
| 3,670,907 | A | | 6/1972 | Downing |
| 3,921,853 | A | | 11/1975 | Burgess, Jr. |
| 4,062,474 | A | | 12/1977 | Herbold |
| 4,121,724 | A | | 10/1978 | Fischer |
| 4,378,063 | A | | 3/1983 | Silverthorn |
| 4,676,711 | A | | 6/1987 | Burgess, Jr. et al. |
| 5,199,549 | A | | 4/1993 | Lutke |

(Continued)

FOREIGN PATENT DOCUMENTS

| CH | 675343 A5 | 9/1990 |
| FR | 1338458 | 8/1963 |

(Continued)

OTHER PUBLICATIONS

CH675343(A5)—English Abstract.
(Continued)

Primary Examiner — Mark A Deuble
(74) Attorney, Agent, or Firm — Zarley Law Firm, P.L.C.

(57) ABSTRACT

A grain sweep assembly having an A-shaped frame, a first and a second panel connected to the frame, and a drive assembly that has a plurality of paddles connected to a continuous chain that extend through a return chamber.

15 Claims, 6 Drawing Sheets

(56) References Cited

U.S. PATENT DOCUMENTS

| | | | | |
|---|---|---|---|---|
| 6,499,930 B1 * | 12/2002 | Dixon | ............... | B65G 65/425 |
| | | | | 198/520 |
| 8,616,823 B1 * | 12/2013 | Hoogestraat | ......... | B65G 65/466 |
| | | | | 414/310 |
| 8,770,388 B1 | 7/2014 | Chaon et al. | | |
| 8,967,937 B2 | 3/2015 | Schuelke et al. | | |
| 9,120,633 B2 | 9/2015 | Ahlen | | |
| 9,199,807 B1 * | 12/2015 | Schuelke | ............... | B65G 65/40 |
| 9,288,946 B1 * | 3/2016 | Schuld | ............... | A01F 25/2018 |
| 2016/0107849 A1 * | 4/2016 | Olson | ............... | B65G 65/466 |
| | | | | 198/674 |
| 2016/0152442 A1 * | 6/2016 | Weber | ............... | B66B 19/00 |
| | | | | 187/359 |
| 2017/0190513 A1 * | 7/2017 | Kaeb | ............... | B65G 21/08 |

FOREIGN PATENT DOCUMENTS

| | | |
|---|---|---|
| FR | 2309442 | 11/1976 |
| FR | 2630620 A1 | 11/1989 |
| GB | 711048 | 6/1954 |
| GB | 841024 | 7/1960 |
| GB | 930721 | 7/1963 |
| GB | 1199920 | 7/1970 |
| GB | 2069448 A | 8/1981 |

OTHER PUBLICATIONS

FR1338458—English Abstract.
FR2309442—English Abstract.
FR2630620A1—English Abstract.

* cited by examiner

PADDLE SWEEP

CROSS REFERENCE TO RELATED APPLICATION

This application claims the benefit of U.S. Provisional Application No. 62/311,748 filed Mar. 22, 2016

BACKGROUND OF THE INVENTION

This invention is directed to a grain sweep assembly and, more particularly, to a grain sweep assembly using a plurality of paddles.

Grain sweep assemblies are well-known in the art and are utilized in grain storage bins for moving particulate matter across the floor of a bin to a desired location, such as a sump at the center of the bin. From the sump, particulate matter is transported under the floor and out of the bin. Often, grain sweep assemblies have augers with helical flighting that contacts the particulate matter and moves it towards the sump by rotating the auger. While useful, these assemblies present challenges in that they require more power to operate than paddle sweeps, and leaves more grain behind than desired. To improve upon this, paddle augers or paddle sweep assemblies have been utilized that use less power and are more safe to use. The use of paddles with a sweep assembly tends to be more effective in cleaning bin floors as compared with traditional augers.

While useful, with existing paddle sweeps grain tends to fall over the top panel of the paddle sweep burying the paddle sweep in the grain instead of dispersing the grain toward the floor more easily. In addition, existing paddle assemblies do not break apart out of condition grain. Therefore, a need exists in the art for a device that addresses these deficiencies.

Accordingly, an objective of the present invention is to provide a paddle sweep that removes grain from the floor more easily. Another objective of the present invention is to provide a paddle sweep that is more safe to use. A still further objective is to provide a paddle sweep able to break apart grain that is out of condition. These and other objectives will be apparent to one skilled in the art based upon the following written description, drawings, and claims.

SUMMARY OF THE INVENTION

A grain sweep assembly having a first panel connected to a second panel to form an A-shape. The panels are connected to a frame having a support member that includes a pair of beams separated by a web plate. A plurality of braces and a pair of end plates are connected to the support member.

A plurality of paddle support tubes are connected to and extend between the first and second panels. The support tubes, panels, and frame form a return chamber.

Disposed within a drive housing is a drive assembly. The drive housing is configured to permit the grain sweep assembly to float up and down in relation to the grain bin floor as the assembly moves across the bin floor. The drive assembly has a continuous chain or belt mounted about a pair of rollers. Connected to the chain are a plurality of paddles.

DETAILED DESCRIPTION OF THE PREFERRED EMBODIMENT

Figure 1:
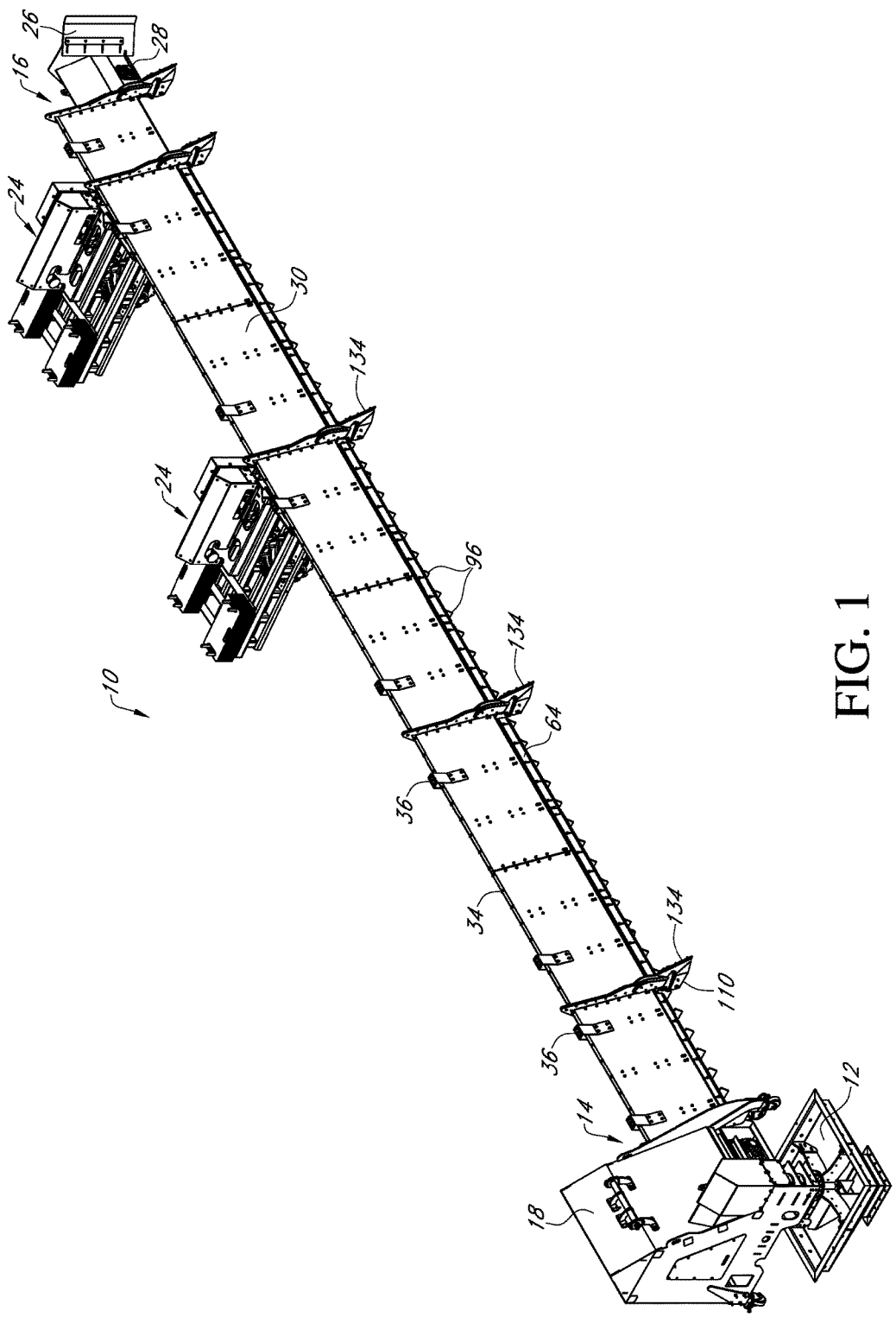
FIG. 1 is a perspective view of a grain sweep assembly.
Figure 2:
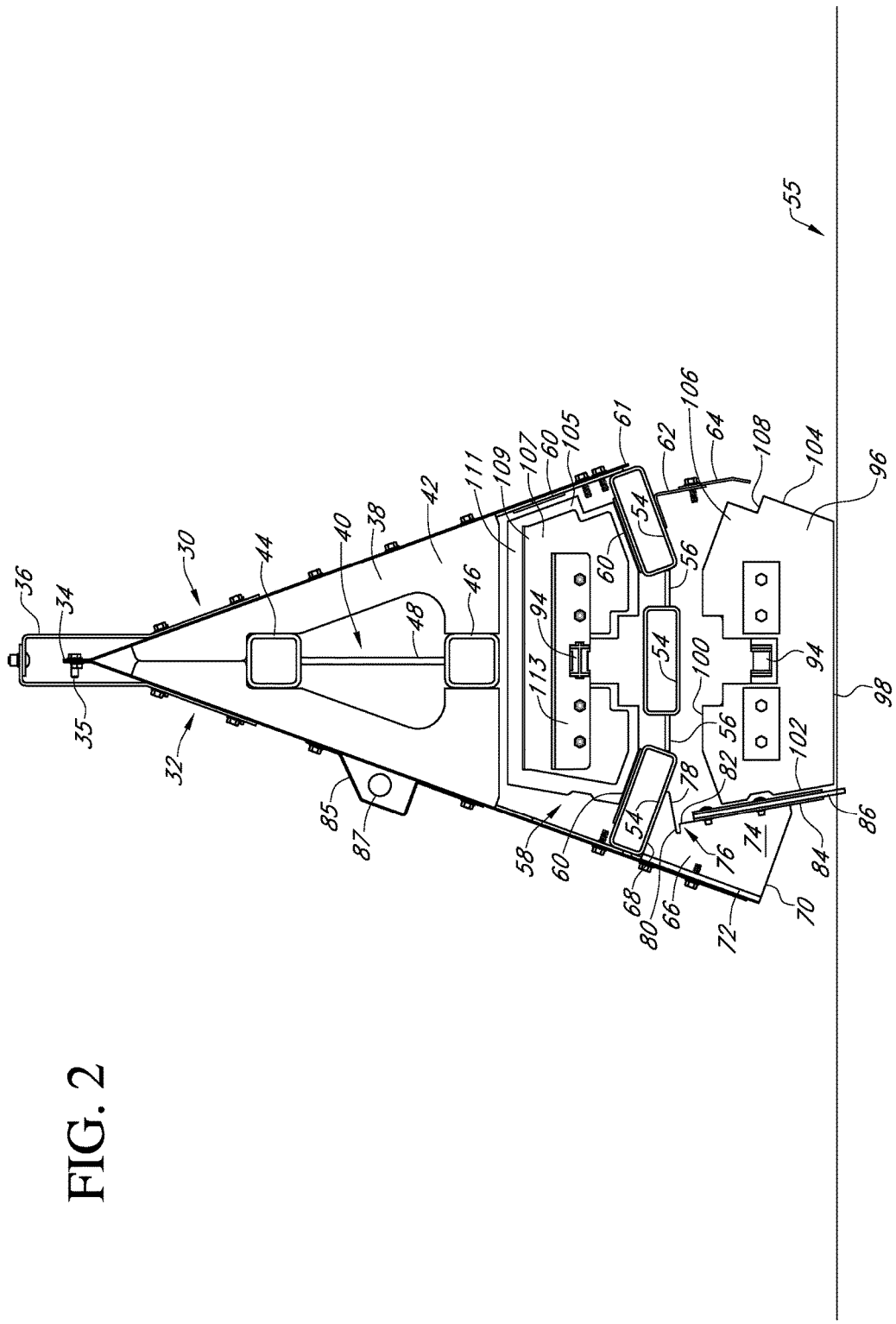
FIG. 2 is an end section view of a grain sweep assembly.
Figure 3:
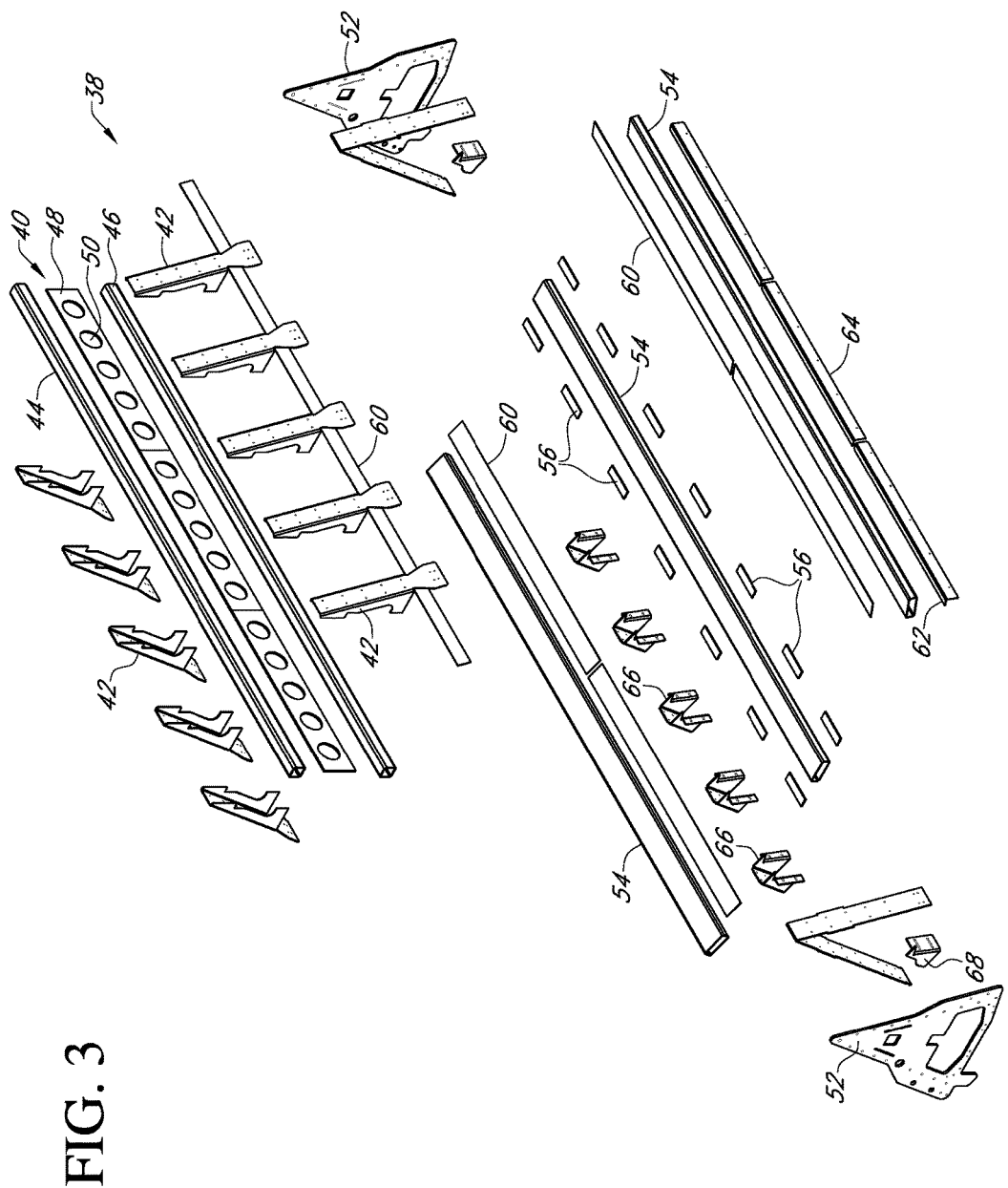
FIG. 3 is an exploded perspective view of a frame for a grain sweep assembly.
Figure 4:
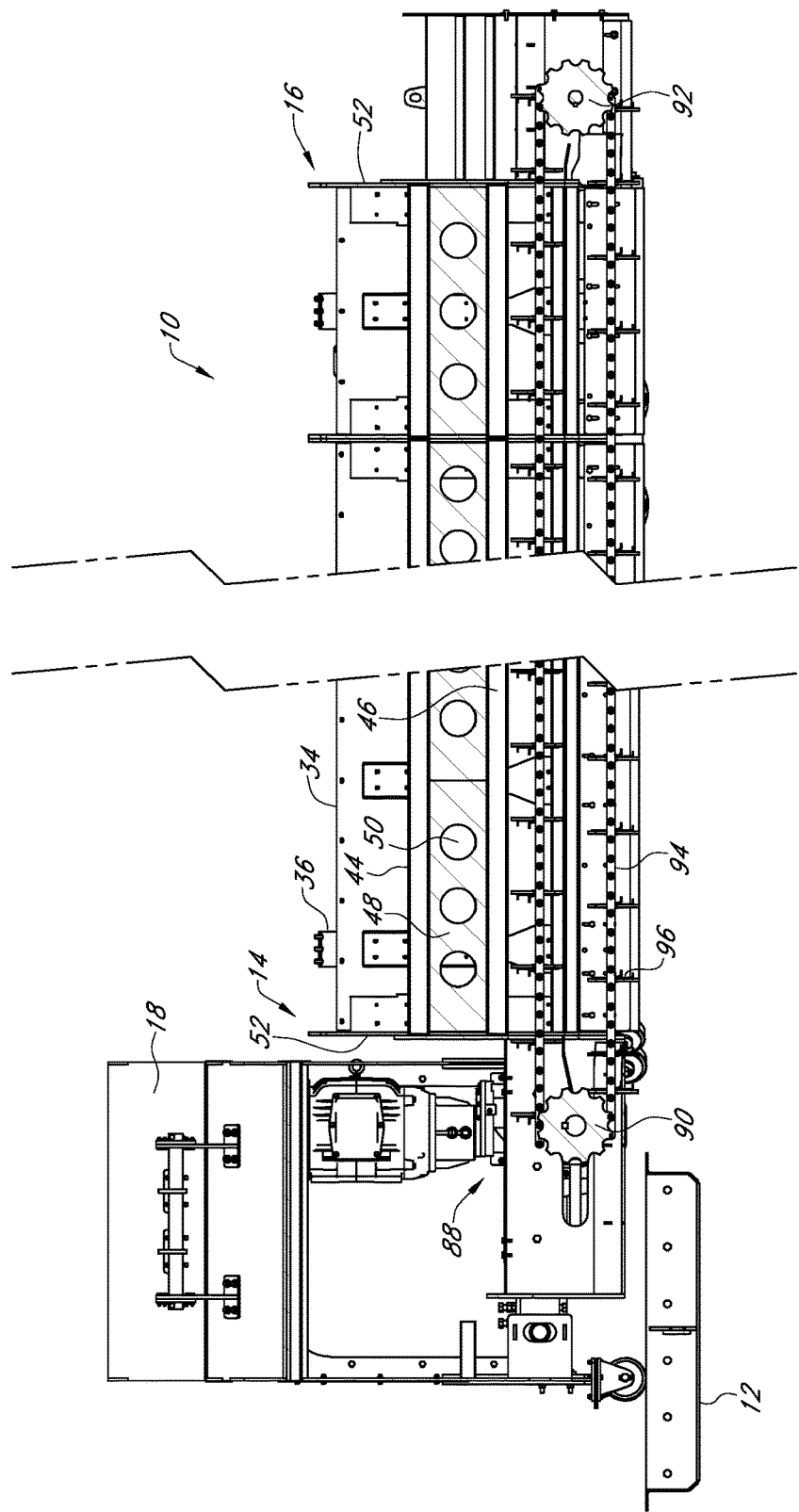
FIG. 4 is a side sectional view of a grain sweep assembly.
Figure 5:
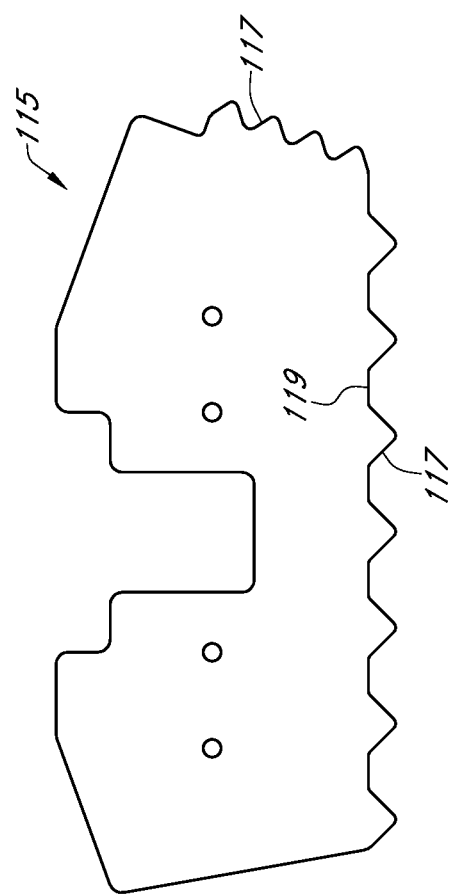
FIG. 5 is an end view of a grain breaker.
Figure 6:
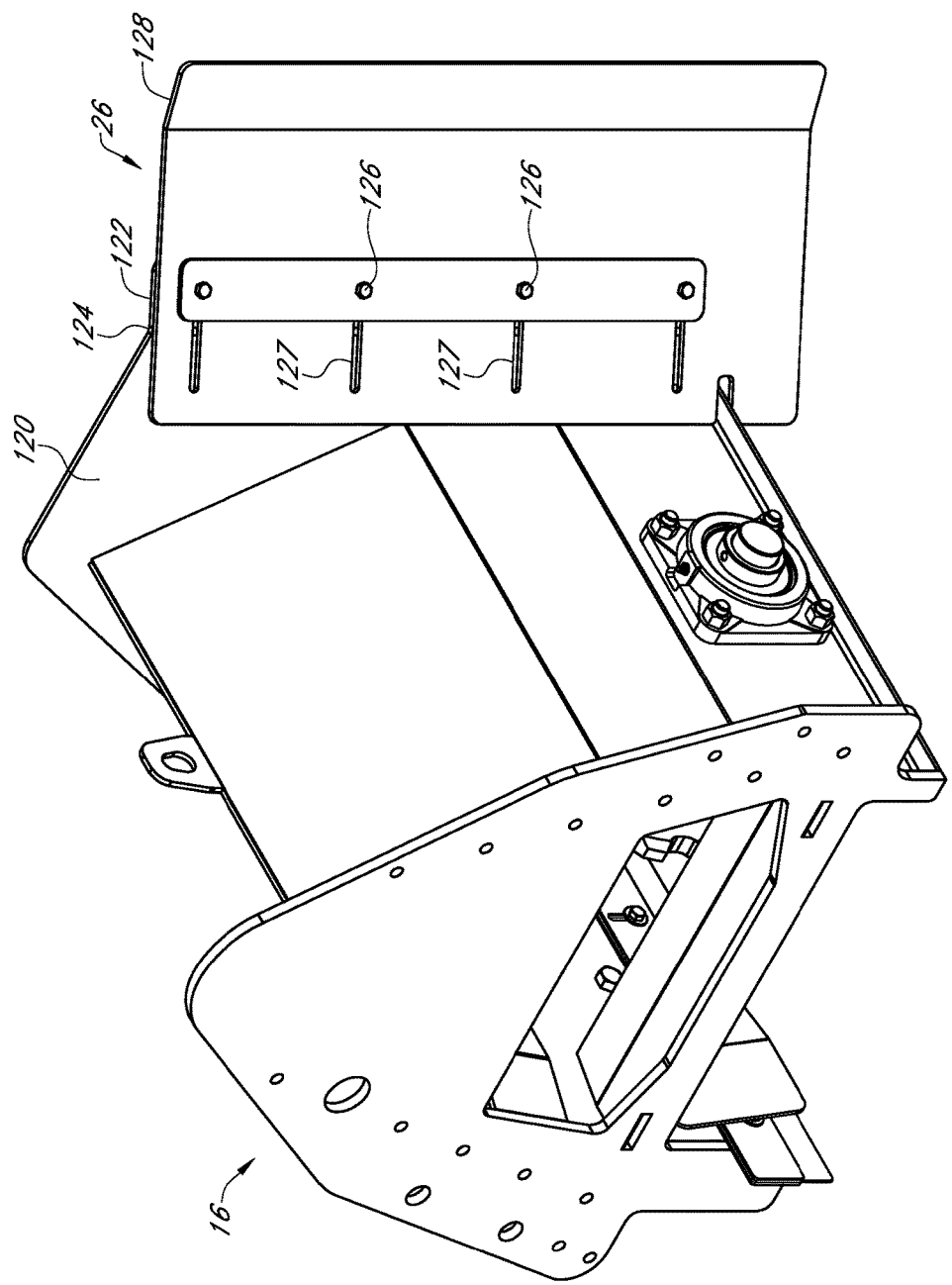
FIG. 6 is a perspective view of an edge scraper.

Referring to the Figures, a paddle sweep assembly 10 extends from a center sump 12 at a first end 14 adjacent a sidewall of a bin (not shown) at a second end 16. The first end 14 of the paddle sweep assembly 10 is connected to a drive housing 18. The drive housing 18 has pins that are received in slots on a pivot arm/slip ring support assembly, allowing the sweep to float up and down following the bin floor. An example of one drive housing is found in U.S. Pat. No. 9,327,921 which is hereby incorporated by reference in its entirety. The pivot arm/slip ring support pivots around the center of the bin, allowing the sweep to rotate around the bin. Connected at the second end 16 or tail section of assembly 10 is at least one pusher 24, an edge scraper 26, and a slack adjuster 28. The slack adjuster 28 may alternatively be connected at the first end 14.

The paddle sweep assembly 10 has a first or front wall or panel 30 and a second or back wall or panel 32. Walls 30 and 32 are connected at an end 34 and extend downwardly at an angle to form an A-shape. End 34 is connected in any manner such as through a weld. Preferably, end 34 is bent so that a portion of walls 30 and 32 engage in a generally vertical relation and are connected with a plurality of bolts 35. Alternatively, walls 30 and 32 are formed from a single folded sheet. Preferably, back wall 32 is longer than front wall 30. A plurality of lift brackets 36 are connected to walls 30 and 32 and extend above end 34. The walls 30 and 32 are also connected to and cover an A-shaped frame 38. The frame 38 has a support member 40 connected to a plurality of support braces 42 wherein the member 40 extends the length of the assembly. Preferably, the support member 40 has a top beam 44 and a bottom beam 46 separated by a web plate 48 having a plurality of apertures 50. The end plates 52 are connected to each end of the frame 38.

Positioned below the frame 38 are a plurality of paddle support tubes or stiffeners 54. Preferably, three support tubes 54 are used with the outer two perpendicularly connected to walls 30 and 32 so that they angle downwardly from walls 30 and 32 toward the floor 55. The middle support tube 54 is connected to the outer support tube 54 by braces 56 and the middle support tube 54 dwells in a horizontal plane parallel to the ground. The frame 38, walls 30 and 32, and support tubes 54 and braces 56 form a return chamber 58. The braces 56 allow grain to drop from the return chamber 58 to the floor 55.

Connected to a top surface of the outer support tubes 54 are wear strips 60. A wear strip 60 is also connected to an inner surface of the front wall 30 adjacent a lower end 61 of the wall 30. Connected to a bottom surface of the outer support tube 54 connected to the wall 30 is a mounting bracket 62 that extends downwardly from the support tube 54. Removably and adjustably connected to the mounting bracket 62 is a grain intake shield 64.

Connected to a bottom surface of the outer support tube 54 connected to an inner surface of the wall 32 is a scraper support 66. The scraper support 66 is of any size, shape, and structure and, in one example, has a top 68, a bottom 70, a back 72, sides 74, and a front 76. The front 76 has a first angled section 78 that angles inwardly from the top 68 to a transition point 80. A second section 82 angles outwardly from the transition point 80 to the bottom 70. Adjustably mounted to the second section 82 of the scraper support 66 is a scraper 84 that preferably has a rubber tip portion 86. Connected to an outer surface of the back wall 32 is a conduit shield 85 that receives a power conduit 87.

Rotatably connected to a drive (not shown) disposed within a portion of the drive housing 18 is a drive assembly 88. The drive assembly has a first roller 90 connected to the drive within the drive housing 18 and a second roller 92 connected to the assembly 10 at the second end 16. A continuous chain 94 is mounted about the first and second rollers 90 and 92.

Connected to the chain 94 are a plurality of paddles 96. The paddles 96 are of any size, shape, and structure and, in one example, have a first edge 98, a second edge 100, and a pair of side edges 102 and 104. The first edge 98 is generally straight and dwells in a plane parallel to the floor 55. The second edge 100 has angled corners 106 that correspond to the top surface of outer support tubes 54 when paddles 96 travel through return chamber 58.

The side edge 102 is angled outwardly from the first edge 98 to the second edge 100 and is generally parallel to the scraper 84 and second section 82 of the scraper support 66. The side edge 104 is angled outwardly from the first edge 98 toward the second edge 100 and has a notch 108 at the second edge 100. The angle of the side edge 104 corresponds with the angle of the wall 30 within the return chamber 58. The angle of the second wall 32 in relation to the floor can vary as can the angle between the first wall and the second wall without departing from the scope of the invention.

In one embodiment, each paddle 96 has a portion 105 made of rubber belting or the like that is connected to a resilient support plate 107. Portion 105 extends beyond an outer edge 109 of support plate 107 to provide a flexible edge 111. Portion 105 and plate 107 are connected to a bracket 113 that connects the paddle 96 to the chain 94. Also, connected to the chain 94 and positioned in spaced relation to adjacent paddles 96, is a grain breaker 115. The grain breaker 115 is of any size, shape, and structure. In one example, the breaker 115, made preferably of a resilient polyurethane, is oblong in shape having a plurality of teeth 117 extending outwardly from an outer perimeter 119. Rather than sweep grain, the breaker 115 breaks apart grain which has become compacted.

The edge scraper 26 is of any size, shape, and structure. In one example, as shown, the edge scraper 26 is connected to an end plate 120. The end plate 120 is connected to the assembly 10 at the second end 16. Preferably, end plate 120 has a mounting flange 122 that extends from a first or forward edge 124 of the end plate 120 toward the sidewall of the bin (not shown) at an angle.

The edge scraper 26 is adjustably connected to the mounting flange 122 by one or more bolts 126 that extend through slots 127 such that the scraper 26 is at an angle in relation to the end plate 120. Preferably, the scraper 26 has a first or outer end 128 that is set at an angle away from the scraper 26 and end plate 120. The end scraper 26 assists in directing particulate matter inwardly away from the bin sidewall and into the path of the assembly 10.

In an additional embodiment, the end plate 120 has a second mounting flange at a second or rearward end of the end plate 120. Preferably, the second mounting flange extends inwardly from the end plate 120 at an angle.

In operation, the assembly 10 rotates about the central sump 12 and is supported in part by carrier wheels 110. As assembly 10 rotates about sump 12, the chain rotates about rollers 90 and 92, such that the paddles 96 move toward the sump 12 when adjacent the floor and away from the sump 12 when within the return chamber 58.

What is claimed is:

1. A grain sweep assembly, comprising:
a first panel connected to a second panel at an end and extending downwardly and outwardly from the end to form an A-shape;
a frame having a support member that includes an upper beam and a lower beam separated by a web plate, a return chamber, and connected to the first and the second panel; and
a drive assembly having a plurality of paddles connected to a continuous chain that extends through the return chamber.

2. The assembly of claim 1 wherein the drive assembly is disposed within a drive housing configured to permit the grain sweep assembly to float up and down in relation to a grain bin floor.

3. The assembly of claim 1 wherein a plurality of lift brackets are connected to the first panel and the second panel and extend above the end of the first and second panels.

4. The assembly of claim 1 having a removable and adjustable intake shield connected to a mounting bracket that is connected to a support tube positioned between the first and the second panel.

5. The assembly of claim 1 having a scraper connected to a scraper support that is connected to a bottom surface of a support tube positioned between the first and the second panel.

6. The assembly of claim 1 wherein the plurality of paddles have a rubber portion connected to a resilient support plate.

7. The assembly of claim 1 having an edge scraper mounted to an end of the assembly.

8. A grain sweep assembly, comprising:
a frame having a support member that includes a top beam and a bottom beam separated by a web plate:
a plurality of support braces and a pair of end plates connected to the support member;
a first wall and a second wall connected to the frame;
a plurality of paddle support tubes connected to and extending between the first wall and the second wall, below the frame; and
a drive assembly having a plurality of paddles connected to a continuous chain that extends through a return chamber formed by the frame, first wall, second wall, and paddle support tubes.

9. The sweep assembly of claim 8 wherein at least one wear plate is attached to a top surface of at least one of the paddle support tubes.

10. The sweep assembly of claim 8 further comprising an intake shield connected to a mounting bracket that is connected to a bottom surface of the paddle support tubes.

11. The sweep assembly of claim 8 further comprising a scraper connected to a scraper support that is connected to an inner surface of the second wall.

12. The sweep assembly of claim 8 wherein the drive assembly is disposed within a drive housing that is configured to permit the grain assembly to float up and down in relation to a grain floor.

13. A grain sweep assembly, comprising:
a frame having a support member connected to a plurality of support braces;
a first panel and a second panel connected to the support braces; and a drive assembly having a plurality of paddles connected to a continuous chain wherein the support member of the frame includes an upper beam and a lower beam separated by a web plate.

14. The assembly of claim 13 wherein the first panel and the second panel are connected at an end and extend downwardly and outwardly from the end to form an A-shape.

15. The assembly of claim 13 wherein the drive assembly is disposed within a drive housing configured to permit the grain sweep assembly to float up and down in relation to a grain bin floor.

* * * * *